United States Patent [19]

Sudo et al.

[11] Patent Number: 4,605,823
[45] Date of Patent: Aug. 12, 1986

[54] PHONE CONFERENCE SYSTEM

[75] Inventors: Yozo Sudo, Yamato; Hiroyuki Mori, Tama; Atsuya Murai, Kawasaki, all of Japan

[73] Assignee: Fujitsu Limited, Kawasaki, Japan

[21] Appl. No.: 549,471

[22] Filed: Nov. 7, 1983

[30] Foreign Application Priority Data

Nov. 12, 1982 [JP] Japan ............................ 57-171933[U]

[51] Int. Cl.⁴ ........................ H04M 1/60; H04M 3/56
[52] U.S. Cl. ............................... 179/18 BC; 179/81 B
[58] Field of Search .................. 179/18 BC, 81 B, 37; 381/119

[56] References Cited

U.S. PATENT DOCUMENTS

| | | | |
|---|---|---|---|
| 3,378,639 | 4/1968 | Dufendach et al. | 179/37 |
| 3,824,344 | 7/1974 | James et al. | 179/18 BC |
| 3,925,618 | 12/1975 | Kato et al. | 179/81 B |
| 4,008,376 | 2/1977 | Flanagan et al. | 179/18 BC |
| 4,359,606 | 11/1982 | Shoichi | 179/18 BC |
| 4,449,238 | 5/1984 | Lee et al. | 381/110 |

FOREIGN PATENT DOCUMENTS

| | | | |
|---|---|---|---|
| 0107373 | 8/1980 | Japan | 179/18 BC |
| 0075764 | 6/1981 | Japan | 179/18 BC |
| 58-56564 | 4/1983 | Japan . | |

Primary Examiner—Thomas W. Brown
Attorney, Agent, or Firm—Staas & Halsey

[57] ABSTRACT

A phone conference system which includes a plurality of microphones and a speaker or speakers which are connected to a telephone. In the phone conference system, a required number of units are connected in cascade fashion. Each unit includes a speaker or speakers, connected via an amplifier to a receiving line, a preamplifier-mixer for unifying the outputs of the microphones, and a summing amplifier unifying the output of the preamplifier-mixer and the output a microphone or microphones from another unit.

5 Claims, 8 Drawing Figures

PHONE CONFERENCE SYSTEM

BACKGROUND OF THE INVENTION

1. Field of the Invention

The present invention relates to a phone conference system and more particularly to an improvement of a phone conference system which interconnects conferences held at a plurality of sites as if the plurality of conferences were being held at only one site.

2. Description of the Prior Art

Due to the developments made in transportation systems, the traveling time between two or more places has been made considerably shorter. The utilization of transportation systems for participating in conferences however, requires time and expense, the amount of time and expense being proportional to the number of people participating in a conference. Therefore, a conference held by people from factories located at different sites involves much expense and loss of time.

In view of this expense and loss of time, there has been a need for the unification of a plurality of conference sites by a telephone switching system. Consequently, a phone conference system in which the drawbacks of conventional phone conference systems are eliminated has recently been developed.

In conventional phone conference systems, the number of microphones and speakers are determined according to the number of participants and the arrangement of each of the conference seats. The number of microphones and speakers are also determined so that a participant's voice can be clearly heard by all of the other participants without the necessity of rearranging the microphones and speakers.

The number of participants differs in accordance with the content of the conference, with the result that the required number of speakers and microphones differs depending on the type of conference. Therefore, the capacity suitable for common amplifiers for the transmitter-receiver and the number of circuits used in mixers also differ.

Usually, at each conference site, the conference system is formed with a suitable scale of equipment in accordance with the number of participants so that various conference systems providing a predetermined number of microphones and speakers are provided.

Consequently, if the scale of the conference is determined in accordance with the maximum number of participants, a phone conference system is usually uneconomical.

SUMMARY OF THE INVENTION

An object of the present invention is to provide a phone conference system in which the above-mentioned drawbacks are eliminated and in which the scale of a conference can be determined in accordance with the minimum number of participants.

Another object of the present invention is to provide a phone conference system in which the scale of the system can be varied in accordance with the number of participants.

The above-mentioned objects can be achieved by providing a phone conference system in which microphones and speakers are connected to a telephone apparatus, wherein speakers connected via an amplifier to a receiving line, a preamplifier-mixer which unifies the outputs of a plurality of microphones, and a summing amplifier which unifies the output of the preamplifier-mixer and the output of a microphone or microphones from another unit are formed as one unit, and the required number of units are connected in cascade to the telephone apparatus.

Further features and advantages of the present invention will be apparent from the ensuing description, with reference to the accompanying drawings, to which, however, the scope of the invention is in no way limited.

DESCRIPTION OF THE PREFERRED EMBODIMENTS

Figure 1:
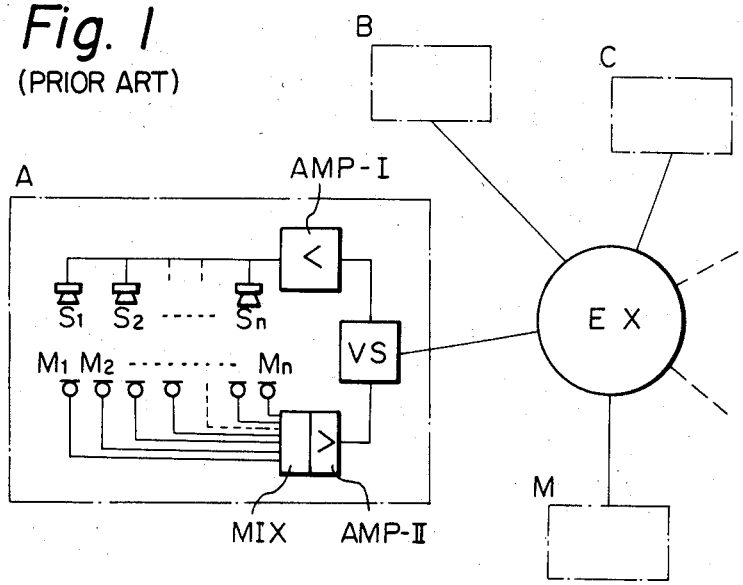
FIG. 1 is a block diagram of one example of a conventional phone conference system.

As is shown in FIG. 1, in one example of a conventional phone conference system, the apparatuses A, B, C, . . . M located in separate places provide a plurality of speakers $S_1, S_2, \ldots, S_n$, a common receiving amplifier AMP-I for the speakers, a plurality of microphones $M_1, M_2, \ldots M_n$, a mixier MIX for the microphones, a common sending amplifier AMP-II, and a voice switch $V_S$. The apparatuses A, B, C, . . . M are connected to each other via an exchanger EX.

In the prior art system shown in FIG. 1, the scale of the system is determined by the maximum number of participants. Therefore, when the number of participants is small, this system is uneconomical.

Figure 2:
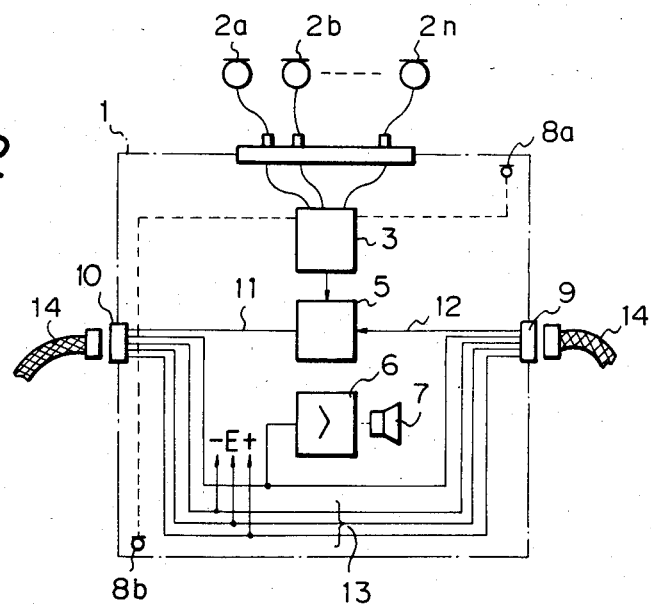
FIG. 2 is a block diagram of one unit in one embodiment of a phone conference system according to the present invention.

FIG. 2 is a block diagram of one unit in one embodiment of the system according to the present invention. In FIG. 2, unit body 1 includes a preamplifier-mixer 3 which unifies the outputs of a plurality of microphones $2a, 2b, \ldots, 2n$ detachably connected to the unit body 1 with a plug jack, a summing amplifier 5 which unifies the output of the preamplifier-mixer 3 and the output of another unit, a receiving amplifier 6, and a speaker 7. Internal microphones 8a and 8b positioned in corners of the unit body 1 are connected to the preamplifier-mixer 3 and can be used in place of the microphones $2a, 2b, \ldots, 2n$ attached to the outside of the unit body 1. An input jack 9 and an output jack 10 are provided on the side of the unit body 1. The input jack 9 and the output jack 10 include a sending wire 11 to the voice switch (not-shown), a receiving wire 12 from the voice switch, and a set of power source lines and ground lines 13. The jacks 9 and 10 are connected, via a connecting plug fitted to the jacks, to a connecting cable 14.

Figure 3A:
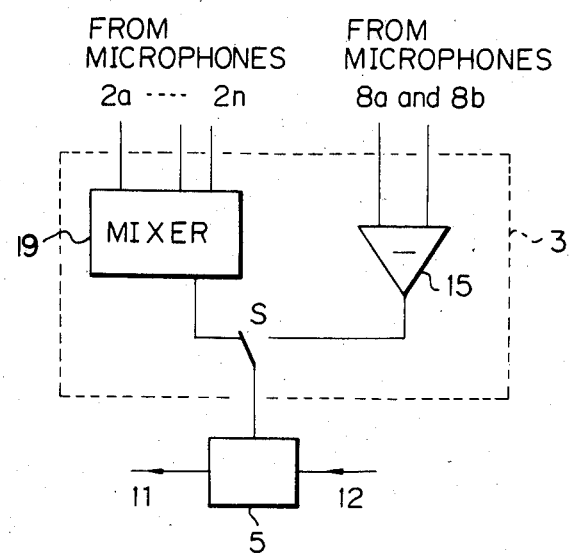
FIG. 3A is a block diagram of the preamplifier-mixer shown in FIG. 2.
Figure 3B:
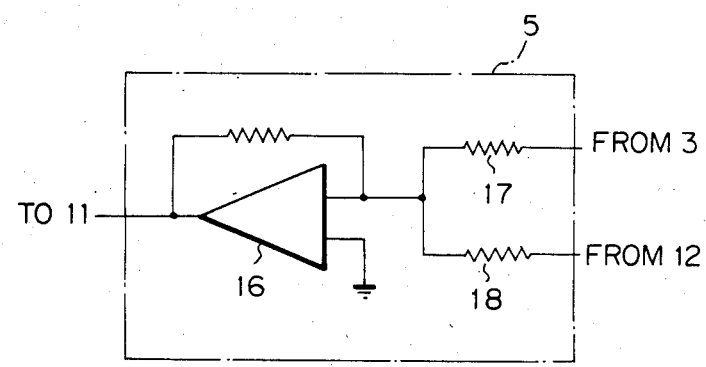
FIG. 3B is a block diagram of the summing amplifier shown in FIG. 2.

The preamplifier-mixer 3 shown in FIG. 2 is formed as is shown in FIG. 3A. In FIG. 3A, a mixer 19 receives the outputs of the microphones $2a \ldots 2n$, and a differential amplifier 15 receives the outputs of the microphones 8a and 8b. The outputs of the microphones 8a and 8b are differentially amplified by a conventional method described in a prior Japanese patent application (Patent Application No. 56-155023, Unexamined Patent Publication No. 58-56564) which has already been filed in the Japanese Patent Office. The switch S selects the output of the mixer 19 or the output of the differential amplifier 15 as occasion demands. FIG. 3B shows the summing amplifier 5, which is formed by an operational amplifier 16 and resistors 17 and 18.

Figure 4:
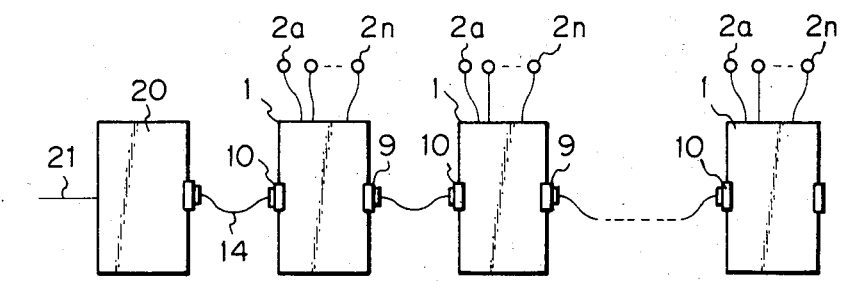
FIG. 4 is a block diagram of one embodiment of a phone conference system according to the present invention.

In FIG. 4, the unit body 1 shown in FIG. 2 is connected in cascade fashion, taking into consideration the number of participants, and the arrangement of seats. The desired number of unit bodies are connected by cables 14, and the cascade connection of the unit bodies is connected, via a common voice switch 20 and a 21, to an exchanger or a voice switch in another place not shown in the drawing.

In a system according to the present invention, a microphone is required for each participant. However, one speaker can be commonly used for several participants, for example, five or six participants, in the most ordinary arrangement of seats. Therefore, one unit may be formed by including one speaker and five or six microphone units, one receiving amplifier, a common amplifier, and a mixer. For the purpose of increasing the scale by combining a plurality of units, the summing amplifier unifies the outputs of the microphones in each unit without causing mutual interference of these outputs. That is, the input levels of the summing amplifier (the output levels of the preamplifier-mixer), can be formed of an equal level, and the outputs of the microphones supplied to a commonly used voice switch (for example, VODAS-Voice Operated Device Anti-Singing) are always constant regardless of the number of unit bodies.

The speaker included in each unit is provided with an amplifier so that the desired output can be obtained by adjusting the gain of the amplifier regardless of the number of unit bodies.

The electric power necessary for each unit can be, of course, included therein. Electric power can also be supplied from a common electric source via the cables 14. The cable 14 may include several wires, including the sending cable, the receiving cable, and the electric source supply cables, and may be connected to the unit body by a jack. The number of unit bodies is adjusted in accordance with the number of participants so that the system can be utilized economically.

Figure 5A:
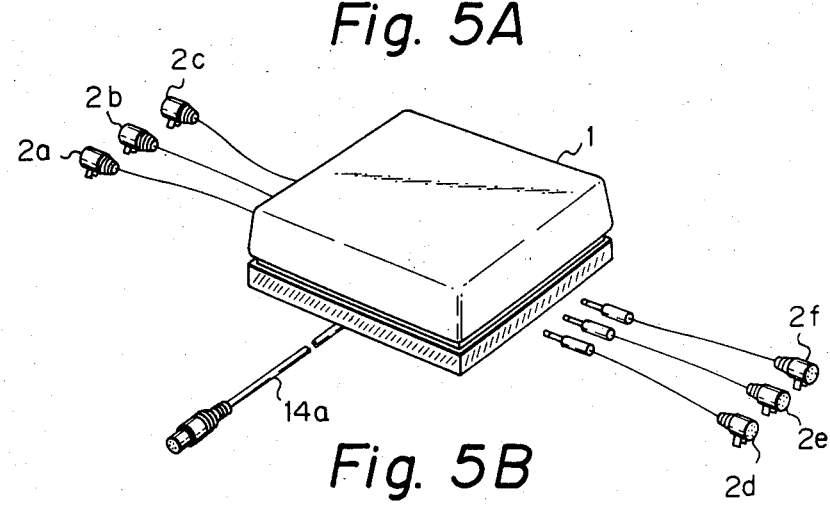
FIG. 5A is a perspective view showing the unit shown in FIG. 2 in an assembled form.
Figure 5B:
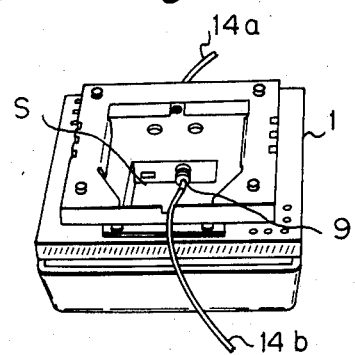
FIG. 5B is a perspective view showing the unit shown in FIG. 5A viewed from the reverse side thereof.

FIG. 5A is an outline of the unit body 1 shown in FIG. 2. The microphones 2a, 2b, 2c, . . . , 2f and the cable 14a corresponding to the cable 14 in FIG. 2 are shown. FIG. 5B shows the reverse side of the unit body shown in FIG. 5A. In FIG. 5B, the cable 14a and the jacks connecting the cable 14b to the unit body 1 are shown. Further, the switch S is used for selecting either the microphones 2a, 2b, 2c, . . . , 2n attached to the outside of the unit body 1 or the microphones 8a and 8b attached to the inside of the unit body 1 for use.

Figure 6:
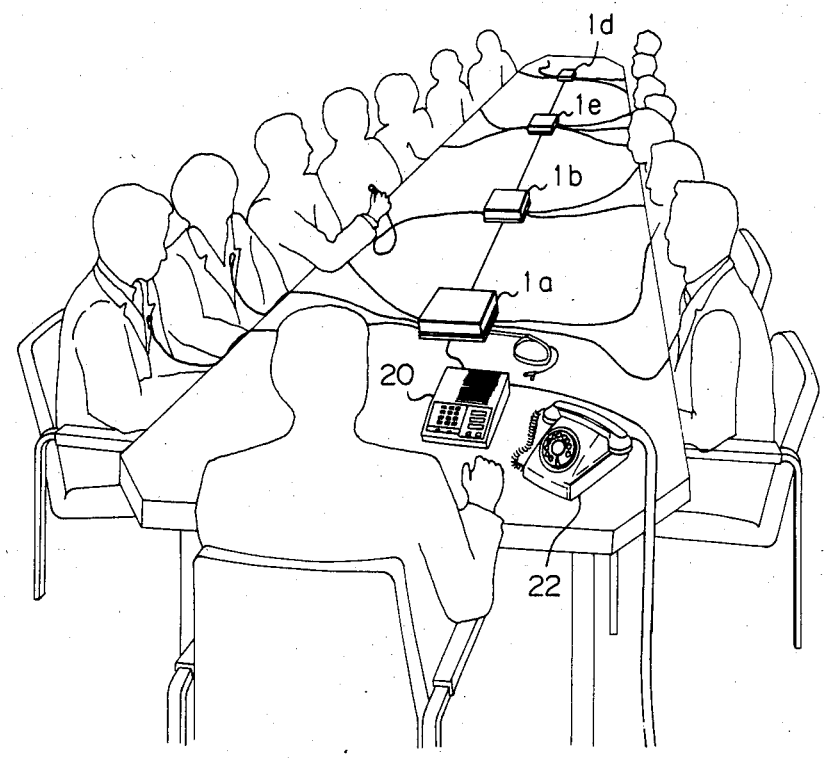
FIG. 6 is a perspective view showing a phone conference in which the system according to the present invention is used.

FIG. 6 is an perspective view of a phone conference in which the system according to the present invention is used. In the phone conference shown in FIG. 6, four unit bodies 1a, 1b, 1c, and 1d are used. The voice switch 20, which, for example, compares the sending voice level and the receiving voice level and automatically switches between the sending mode or the receiving mode, is used for sending a message when one side wishes to do so and for receiving a message when the other side wishes to send one. When the voice switch 20 cannot function as a telephone, a separate telephone 22 should be used. However, the function of the telephone 22 can be combined into the voice switch 20.

As was mentioned above, in the phone conference system according to the present invention, the number of unit bodies is changed in accordance with the scale of the conference so that the phone conference is economical and so that a considerable practical effect can be expected.

We claim:

1. A phone conference system having a plurality of microphones and speakers operatively connected to a telephone, comprising:
   a receiving line operatively connected to the telephone;
   an amplifier operatively connected to the receiving line; and
   a plurality of units, each unit including:
      a speaker operatively connected to the amplifier,
      a preamplifier-mixer, operatively connected to the plurality of microphones and having an output, for unifying the outputs of the plurality of microphones, and
      a summing amplifier, operatively connected to the preamplifier-mixer in the same unit and the preamplifier-mixer in another unit, for unifying the output of said preamplifier-mixer in the same unit and the output of the preamplifier-mixer in another unit, the plurality of units being connected in cascade to said telephone.

2. A phone conference system according to claim 1, wherein:
   each of said units includes a unit body; and
   said plurality of microphones includes a first plurality of microphones operatively connected to the preamplifier-mixer and positioned outside of said unit body and a second plurality of microphones operatively connected to the preamplifier and positioned inside of said unit body.

3. A phone conference system according to claim 2, wherein said preamplifier-mixer comprises:
   a mixer, operatively connected to said first plurality of microphones, for receiving the outputs of said first plurality of microphones;
   a differential amplifier, operatively connected to said second plurality of microphones, for receiving the outputs of said second plurality of microphones; and
   a switch, operatively connected to said mixer, said differential amplifier, and said summing amplifier, for selecting between the output of said mixer or the output of said differential amplifier, said switch having an output which is supplied to the input of said summing amplifier.

4. A phone conference system according to claim 1, wherein each of said unit bodies has a construction by which one speaker and a plurality of microphones are connectable thereto.

5. A phone conference system according to claim 1, further comprising a voice switch for selectively, operatively connecting the microphones and the telephone.

* * * * *

UNITED STATES PATENT AND TRADEMARK OFFICE
CERTIFICATE OF CORRECTION

PATENT NO. : 4,605,823
DATED : August 12, 1986
INVENTOR(S) : Sudo et al.

It is certified that error appears in the above-identified patent and that said Letters Patent is hereby corrected as shown below:

Column 3, line 17, "21" should be --cable 21--.

Signed and Sealed this

Eleventh Day of November, 1986

*Attest:*

DONALD J. QUIGG

*Attesting Officer*   *Commissioner of Patents and Trademarks*